United States Patent
Nishikawa et al.

(10) Patent No.: US 11,233,808 B2
(45) Date of Patent: Jan. 25, 2022

(54) NETWORKING SYSTEM

(71) Applicant: UNIVERSITY OF TSUKUBA, Ibaraki (JP)

(72) Inventors: Hiroaki Nishikawa, Ibaraki (JP); Shuji Sannomiya, Ibaraki (JP)

(73) Assignee: UNIVERSITY OF TSUKUBA, Ibaraki (JP)

( * ) Notice: Subject to any disclaimer, the term of this patent is extended or adjusted under 35 U.S.C. 154(b) by 306 days.

(21) Appl. No.: 16/463,849

(22) PCT Filed: Nov. 24, 2017

(86) PCT No.: PCT/JP2017/042198
§ 371 (c)(1),
(2) Date: May 24, 2019

(87) PCT Pub. No.: WO2018/097242
PCT Pub. Date: May 31, 2018

(65) Prior Publication Data
US 2019/0342317 A1    Nov. 7, 2019

(30) Foreign Application Priority Data
Nov. 25, 2016  (JP) .............................. JP2016-228825

(51) Int. Cl.
*H04L 12/24* (2006.01)
*H04L 12/26* (2006.01)
*H04L 29/06* (2006.01)

(52) U.S. Cl.
CPC ........ *H04L 63/1425* (2013.01); *H04L 41/064* (2013.01); *H04L 41/069* (2013.01);
(Continued)

(58) Field of Classification Search
CPC . H04L 63/1425; H04L 41/064; H04L 41/069; H04L 43/0817; H04L 63/1416; H04L 41/142
(Continued)

(56) References Cited

U.S. PATENT DOCUMENTS 9,477,541 B2 * 10/2016 Chow .................... H04L 41/064
9,843,488 B2 * 12/2017 Balabine ................. H04L 43/04
9,979,606 B2 *  5/2018 Gupta ..................... H04L 43/08
(Continued)

FOREIGN PATENT DOCUMENTS

EP      2738683 A1      6/2014
JP      H6-295243 A    10/1994
(Continued)

OTHER PUBLICATIONS

Svoboda, J., Ghafir, I., & Prenosil, V. (2015). Network monitoring approaches: An overview. Int J Adv Comput Netw Secur, 5(2), 88-93. (Year: 2015).*

(Continued)

*Primary Examiner* — Melvin H Pollack
(74) *Attorney, Agent, or Firm* — Hauptman Ham, LLP (57) ABSTRACT

In a networking system including a plurality of nodes connected with each other by a communication network, each node includes an abnormality discrimination unit configured, when a cumulative consumption current at the time of processing the data received from other node is out of a range (of current values estimated in advance based on an event at the other node, to discriminate the other node as an abnormal. By the networking system, the abnormality of the nodes on the network may be detected with a simple configuration.

7 Claims, 5 Drawing Sheets

(52) U.S. Cl.
CPC ...... *H04L 43/0817* (2013.01); *H04L 63/1416* (2013.01); *H04L 41/142* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 10,097,572 | B1* | 10/2018 | Sohail | G06F 3/0637 |
| 10,142,353 | B2* | 11/2018 | Yadav | H04L 43/04 |
| 10,168,691 | B2* | 1/2019 | Zornio | G05B 19/0421 |
| 10,191,794 | B2* | 1/2019 | Smith | G06F 11/079 |
| 10,193,913 | B2* | 1/2019 | Machlica | H04L 41/12 |
| 10,248,910 | B2* | 4/2019 | Crabtree | G06N 7/005 |
| 10,270,668 | B1* | 4/2019 | Thompson | H04L 41/5009 |
| 10,313,212 | B2* | 6/2019 | Mota | H04L 67/12 |
| 10,333,958 | B2* | 6/2019 | Huang | H04L 43/04 |
| 10,419,931 | B1* | 9/2019 | Sohail | G06F 8/65 |
| 10,469,309 | B1* | 11/2019 | Gupta | H04L 67/10 |
| 10,476,906 | B1* | 11/2019 | Siddiqui | H04L 63/145 |
| 10,574,550 | B2* | 2/2020 | Brewster, Jr. | H04L 43/0817 |
| 10,693,896 | B2* | 6/2020 | Kune | G06F 21/56 |
| 10,735,216 | B2* | 8/2020 | Fadell | G08B 27/003 |
| 2005/0210305 | A1 | 9/2005 | Kihara | |
| 2007/0271452 | A1 | 11/2007 | Foo Kune et al. | |
| 2012/0180126 | A1 | 7/2012 | Liu et al. | |
| 2016/0205123 | A1 | 7/2016 | Almurayh | |
| 2016/0378628 | A1* | 12/2016 | Nguyen | G06F 11/27 714/40 |

FOREIGN PATENT DOCUMENTS

| | | |
|---|---|---|
| JP | 2005-310100 A | 11/2005 |
| JP | 2010-20598 A | 1/2010 |
| JP | 2016-218956 A | 12/2016 |
| WO | 2013/011653 A1 | 1/2013 |

OTHER PUBLICATIONS

A. Milenkovic, M. Milenkovic, E. Jovanov, D. Hite and D. Raskovic, "An environment for runtime power monitoring of wireless sensor network platforms," Proceedings of the Thirty-Seventh Southeastern Symposium on System Theory, 2005. SSST '05., 2005, pp. 406-410, doi: 10.1109/SSST.2005.1460946. (Year: 2005).*
Hahnsang Kim, Joshua Smith, and Kang G. Shin. 2008. Detecting energy-greedy anomalies and mobile malware variants. In Proceedings of the 6th international conference on Mobile systems, applications, and services (MobiSys '08). Association for Computing Machinery, New York, NY, USA, 239-252. (Year: 2008).*
O. Kachirski and R. Guha, "Intrusion detection using mobile agents in wireless ad hoc networks," Proceedings. IEEE Workshop on Knowledge Media Networking, 2002, pp. 153-158, doi: 10.1109/KMN.2002.1115178. (Year: 2002).*
A. Morrow, E. Baseman and S. Blanchard, "Ranking Anomalous High Performance Computing Sensor Data Using Unsupervised Clustering," 2016 International Conference on Computational Science and Computational Intelligence (CSCI), 2016, pp. 629-632, doi: 10.1109/CSCI.2016.0124. (Year: 2016).*
M. Haghighi and D. Cliff, "Sensomax: An agent-based middleware for decentralized dynamic data-gathering in wireless sensor networks," 2013 International Conference on Collaboration Technologies and Systems (CTS), 2013, pp. 107-114, doi: 10.1109/CTS.2013.6567214. (Year: 2013).*
I. Butun, S. D. Morgera and R. Sankar, "A Survey of Intrusion Detection Systems in Wireless Sensor Networks," in IEEE Communications Surveys & Tutorials, vol. 16, No. 1, pp. 266-282, First Quarter 2014, doi: 10.1109/SURV.2013.050113.00191. (Year: 2013).*
H. Fleischmann, J. Kohl, J. Franke, A. Reidt, M. Duchon and H. Krcmar, "Improving maintenance processes with distributed monitoring systems," 2016 IEEE 14th International Conference on Industrial Informatics (INDIN), 2016, pp. 377-382, doi: 10.1109/INDIN.2016.7819189. (Year: 2016).*
M. Usman, V. Muthukkumarasamy, X. Wu and S. Khanum, "Wireless Smart Home Sensor Networks: Mobile Agent Based Anomaly Detection," 2012 9th International Conference on Ubiquitous Intelligence and Computing and 9th International Conference on Autonomic and Trusted Computing, 2012, pp. 322-329. (Year: 2012).*
Extended European Search Report in EP Application No. 17874712.7, dated Jun. 18, 2020, 8pp.
International Search Report in PCT Application No. PCT/JP2017/042198, dated Feb. 20, 2018, 4pp.

* cited by examiner

NETWORKING SYSTEM

RELATED APPLICATIONS

The present application is a national phase of International Application Number PCT/JP2017/042198, filed Nov. 24, 2017, which claims priority to Japanese Application Number 2016-228825, filed Nov. 25, 2016.

TECHNICAL FIELD

The present invention relates to a networking system which is capable of transmitting and receiving data between a plurality of nodes.

BACKGROUND ART

A technique described in Patent Document 1 below is known in the art, which relates to a networking system capable of transmitting and receiving data between a plurality of nodes.

Patent Document 1 (Japanese Patent Laid-Open Publication No. 2010-20598) describes a network system in which nodes having data-driven processors are connected with each other by an autonomously distributed communication network (ad hoc network), and data is transmitted and received.

PRIOR ART DOCUMENT

Patent Document

[Patent Document 1] Japanese Patent Laid-open Publication No. 2010-20598

SUMMARY OF INVENTION

Problems to be Solved by Invention (Problems of the prior art) In the technique described in Patent Document 1, when an abnormality such as a failure or an external attack (denial of service (DoS), etc.), a communication disabled state due to infection with a computer virus, or adversely, transmission of a large amount of data occurs in a certain node among the plurality of nodes existing in the network, there is a problem that communication cannot be performed between other nodes connected via the node in which the abnormality has occurred.

Further, in general, it is not possible for the node in which the abnormality has occurred to notify that an abnormality has occurred to the outside by itself. The reason is that, the node in which the abnormality has occurred has entered a communication disabled state, or cannot notify that an abnormality has occurred due to the external attack. Furthermore, the common ad hoc network as described in Patent Document 1 is not provided with a structure configured to mutually monitor an abnormality of the nodes.

Therefore, when an abnormality occurs in a certain node on the network, there is a risk that the network cannot be maintained.

It is a technical object of the present invention to make it possible to detect an abnormality of nodes on a network with a simple configuration.

Means for Solving Problems

In order to solve the above technical object, according to a first aspect of the present invention, there is provided a networking system including a plurality of nodes connected with each other by a communication network, wherein each node includes: a data-driven processor including a self-synchronous pipeline (self-timed pipeline); a power circuit configured to supply a power to the data-driven processor; a consumption current detection unit configured to detect a consumption current in the data-driven processor; a reception unit configured to receive data from other nodes; and an abnormality discrimination unit configured, when a cumulative consumption current at the time of processing the data received from the other node is out of a range of current values estimated in advance based on an event at the other node, to discriminate the other node as abnormal.

A second aspect of the present invention is the networking system according to the first aspect of the present invention, including a data discarding unit configured, when the reception unit receives data from a node discriminated as abnormal by the abnormality discrimination unit, to discard the received data, thus to isolate the node discriminated as abnormal from the network.

A third aspect of the present invention is the networking system according to the first aspect of the present invention, wherein a configuration to transmit and receive information for a life-and-death monitoring of each node via the network to discriminate the abnormality is not provided.

A fourth aspect of the present invention is the networking system according to the first aspect of the present invention, including a range of current values estimated in advance based on a total amount of the events.

A fifth aspect of the present invention is the networking system according to the first aspect of the present invention, including a range of current values estimated in advance based on a cycle of the event.

Advantageous Effects

According to the first aspect of the present invention, the abnormality discrimination unit of each node may mutually monitor whether an abnormality has occurred in each device by discriminating the abnormality of the other nodes, thus to detect the abnormality of the nodes on the network with a simple configuration. Further, according to the first aspect of the present invention, by using the data-driven processor having a strong correlation between the processing load and the consumption current, it is possible to accurately discriminate the abnormality. Furthermore, according to the invention of the first aspect, by discriminating whether the cumulative consumption current is out of the range of current values estimated in advance based on the event at the other node, if the processing load is excessive or insufficient, it may be determined as abnormal.

According to the second aspect of the present invention, by discarding the data from the node in which the abnormality has occurred, it is possible to substantially and automatically isolate the node in which the abnormality has occurred from the network.

According to the invention described in the third aspect, since the configuration for a life-and-death monitoring of each node is not provided, it is possible to accurately discriminate the abnormality only by detecting the consumption current with no generation of processing load due to the configuration dedicated to the life-and-death monitoring.

According to the fourth aspect of the present invention, it is possible to discriminate the abnormality when the cumulative consumption current is out of the range of consumption current estimated depending on the total amount of events.

According to the fifth aspect of the present invention, it is possible to discriminate an abnormality when the cumulative consumption current is out of the range of consumption currents estimated depending on the cycle of the event.

BRIEF DESCRIPTION OF DRAWINGS

FIGS. 5A and 5B are diagrams illustrating an example of the networking system of Embodiment 1, wherein

MODE FOR CARRYING OUT INVENTION

Hereinafter, an embodiment which is a specific example of embodiments of the present invention will be described with reference to the drawings, but the present invention is not limited to the following embodiment.

Further, in the following description using the drawings, members other than members necessary for the description to facilitate the understanding will not be illustrated and described.

Embodiment 1

Figure 1:
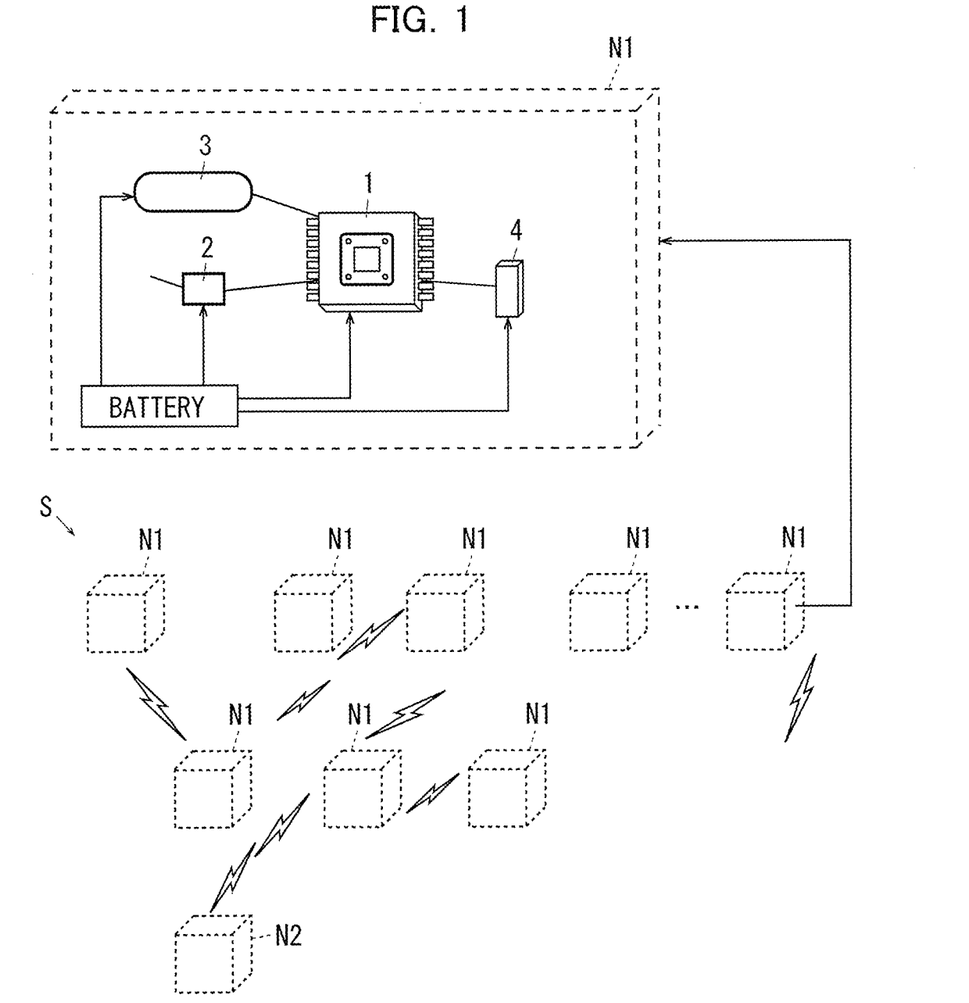
FIG. 1 is an entire view describing a networking system provided with a data-driven processing apparatus of Embodiment 1 of the present invention.

FIG. 1 is an entire view describing a networking system provided with a data-driven processing apparatus of Embodiment 1 of the present invention.

In FIG. 1, a networking system S of Embodiment 1 of the present invention includes a plurality of sensor nodes (nodes) N1 as an example of a data-driven processing apparatus. In addition, an automatic security system device, a monitor (monitoring) device of a structure such as a water pipe or a gas pipe, a monitoring device of an elevated bridge or a location where it is likely to cause mudslide, or a monitoring device of air pollutants and radiation, etc. may be applied to the networking system S of Embodiment 1 as an example of the sensor node (node) N1. Further, the networking system S of Embodiment 1 may also be provided with a node (center node) N2 installed as an example of the data-driven processing apparatus at a center of a security company, a management company or a monitoring organization. Furthermore, in Embodiment 1, unique identification information (node ID) is allocated to each of the nodes N1 and N2.

Each node N1 has a data-driven processor 1 as an example of a processing unit. The data-driven processor 1 includes a firing control (FC) unit, an instruction fetch (IF) unit, an instruction decode (ID) unit, a data processing unit (operation unit, execution (EX)), and a memory access (MA/write back (WB)) unit, etc., and is a conventionally known processor having a self-synchronous pipeline structure. The self-synchronous pipeline structure is disclosed, for example, in International Patent Publication No. 2013/011653, etc., and may employ various configurations, therefore will not be described in detail.

The data-driven processor 1A is electrically connected with a wireless communication module 2 as an example of a communication unit, a sensor 3 as an example of a monitoring unit, and a display 4 as an example of a display member.

The wireless communication module 2 is configured to be able to transmit and receive data by wireless communication between other nodes N1. In addition, the wireless communication system of Embodiment 1 may employ any configuration known in the art, and may employ a wireless LAN, a mobile phone network, near field communication (NFC) or the like. Further, in Embodiment 1, it is possible to employ a sensor network method as an example of an autonomously distributed communication network, or an ad hoc method. That is, a method of performing direct communication between the nodes is employed, rather than performing communication between an access point governing the network and each node as an infrastructure method. Further, the communication network is not limited to the autonomously distributed communication network exemplified in the embodiment, and a wired communication network or a communication network in which a path of communication is generalized (routed) as the infrastructure method.

In addition, the sensor 3 of Embodiment 1 includes, for example, an acceleration sensor, and senses and monitors vibrations of the node N1. Therefore, it is possible to detect vibrations when the node N1 is removed or carried away from an installation site by theft or the like. Further, the acceleration sensor has been provided as an example of the sensor 3, but it is not limited thereto. For example, it is applicable to arbitrary sensors such as a sensor for a machine guard which detects humans or animals as an example of an object to be monitored by electromagnetic waves such as an infrared ray or visible light, or a sensor for fire notification which detects smoke or heat of fire as an example of the object to be monitored. Further, any member, to which a signal such as an image signal from a security camera, for example is input, may be used. In addition, it is also applicable to sensors which monitor a public infrastructure and a private infrastructure for gas leakage of combustible gas or water leakage, for example, smart meters which remotely detect power consumptions in homes and offices, monitoring sensors for monitoring persons living alone, a machine-to-machine (M2M) sensor such as for detection of a sold-out or breakdown state in a vending machine, and all sensors (sensing network) including techniques related to so-called internet of things (IoT), etc., in which things having communication functions are connected with each other via the Internet to perform automatic recognition, automatic control, remote measurement and the like.

In Embodiment 1, the data transmitted and received between the respective nodes N1 and N2 includes identification information (a node ID) of the node N1 of a transmission source, identification information (a data ID) of the data, and a data body such as detection results of the sensor 3.

Further, the data-driven processor 1 of Embodiment 1 includes a so-called multi-core processor of a configuration having a plurality of cores 1a, 1b, 1c and . . . . In Embodiment 1, processing is allocated to each of the cores 1a, 1b, 1c and . . . . For example, a first core 1a is set to perform processing of the detection results of the sensor 3 in its own node N1, or distribution of the received data and the like. A second core 1b is set to process data received from adjacent first nodes N1 and N2, and a third core 1c and a fourth core 1d and . . . are set to process the data received from the adjacent second nodes N1 and N2, and third nodes N1 and N2 and . . . .

Figure 2:
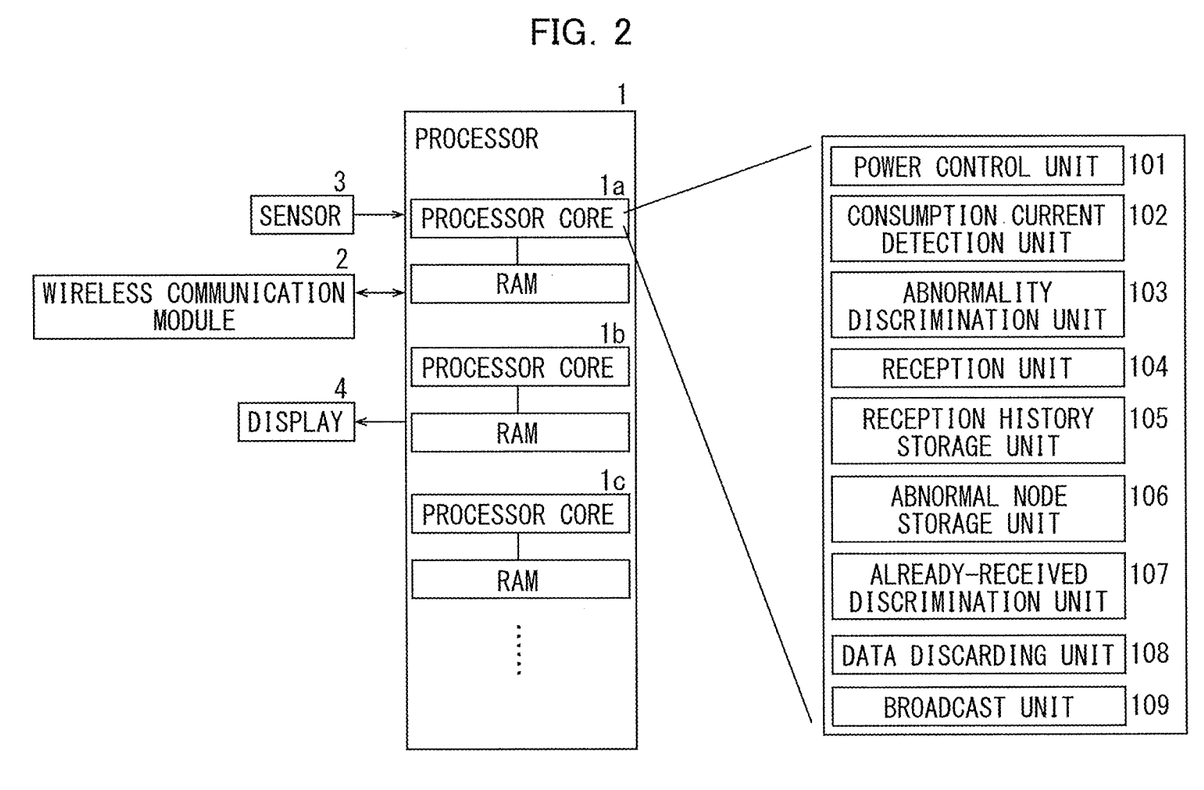
FIG. 2 is a functional block diagram illustrating functions of the data-driven processor of Embodiment 1.

FIG. 2 is a functional block diagram illustrating functions of the data-driven processor of Embodiment 1.

In FIG. 2, the data-driven processor 1 of Embodiment 1 has the following functional units (functional modules) 101 to 109. Further, in Embodiment 1, the functional units 101 to 109 are provided for each core.

The power control unit 101 controls a voltage supplied to the data-driven processor 1.

Figure 3:
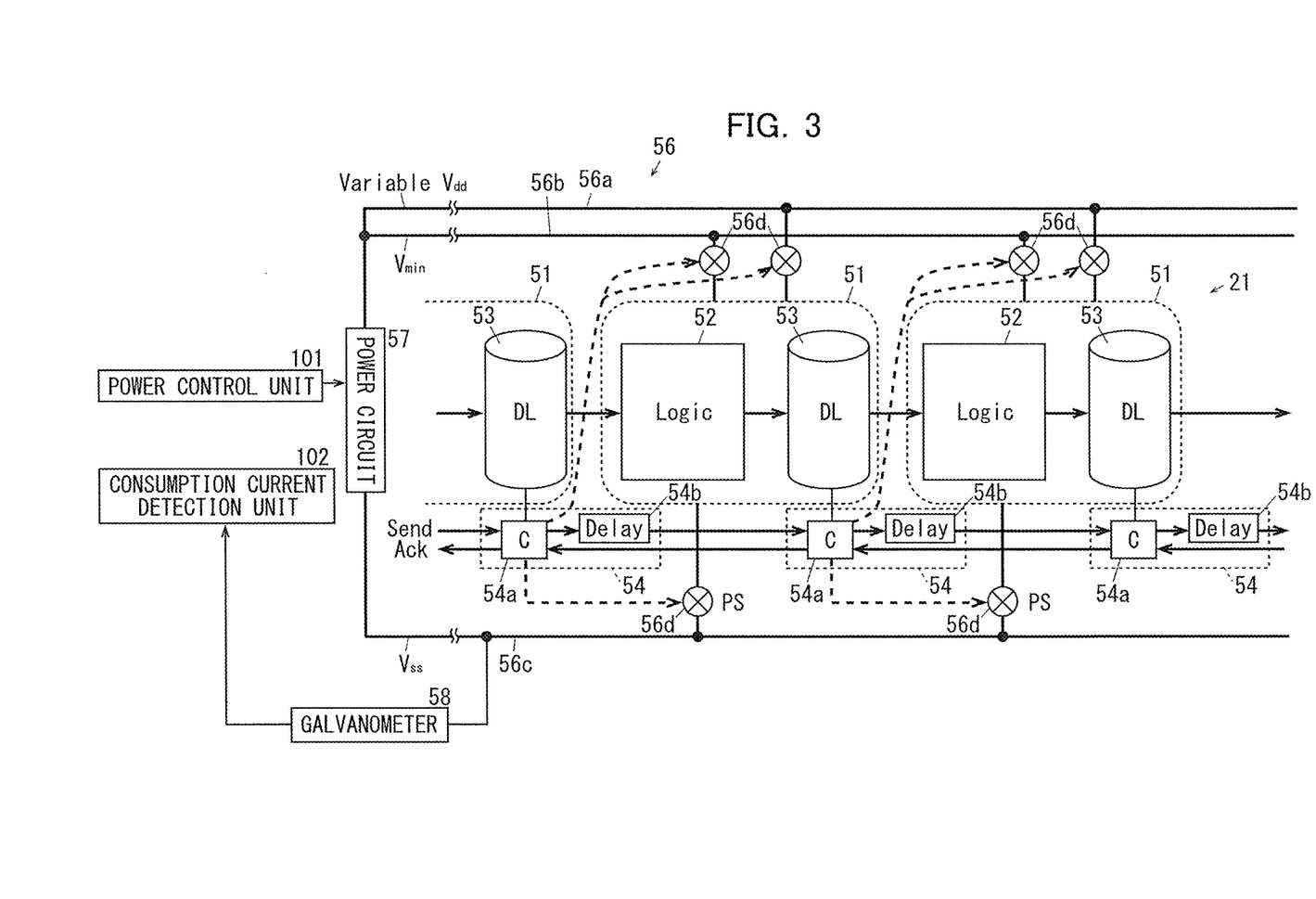
FIG. 3 is a block diagram of an LSI in which the data-driven processor of Embodiment 1 is mounted, which is a diagram describing a self-synchronous elastic pipeline.

FIG. 3 is a block diagram of an LSI in which the data-driven processor of Embodiment 1 is mounted, which is a diagram describing a self-synchronous elastic pipeline.

In FIG. 3, the processor core 21 of the data-driven processor 1 of Embodiment 1 has a pipeline structure due to the self-synchronous elastic pipeline. The processor core 21 of Embodiment 1 has a plurality of pipeline stages 51 corresponding to pipeline stages on functional blocks (on architectures).

In FIG. 3, each pipeline stage 51 has a logic circuit (LC) 52 configured to execute processing of each pipeline stage 51 based on a packet transmitted from an upstream pipeline stage 51 along the flow of packets, a data latch (DL) 53 connected to the logic circuit 52 to hold the packet processed by the logic circuit 52, and a self-timed transfer control mechanism (STCM) 54 configured to supply a synchronization signal (clock signal, or trigger signal) to the data latch 53.

Further, the self-timed transfer control mechanism 54 of Embodiment 1 is configured similarly to the configuration described in Japanese Patent Laid-Open Publication No. 2010-20598, and has a coincidence element (C element) 54a as an example of a data transfer control circuit provided corresponding to each data latch 53, and a delay element 54b configured to ensure a packet processing time in each logic circuit 52. Furthermore, operation and control of the self-timed transfer control mechanism 54 of Embodiment 1 are known as described in Japanese Patent Laid-Open No. 2010-20598, and therefore will not be described in detail.

The logic circuit 52 and the data latch 53 are connected with a power supply line 56 for supplying a drive voltage for driving the system. The power supply line 56 has a drive voltage line 56a for supplying the drive voltage (positive voltage, drain voltage, and drive power) Vdd required when executing the processing in the logic circuit 52, and a lowest voltage line 56b for supplying the lowest voltage (minimum power, power for holding data) Vmin of which is a voltage sufficient to hold packet data in the data latch 53 without executing the processing in the logic circuit 52 and lower than the drive voltage Vdd, and a negative voltage line 56c for supplying a negative voltage (source voltage, reference voltage, for example, ground: earth) Vss. Each of the voltage lines 56a to 56c is provided with a power switch (PS) 56d as an example of a switching element for switching a connection and a disconnection of voltage supply for each pipeline stage 51. That is, by controlling the power switch 56d, it is possible to supply the drive voltage Vdd and the minimum voltage Vmin to each of the logic circuits 52 and the data latches 53, or turn off the voltage supply.

The power supply line 56 is connected with a power circuit 57 to supply the respective voltages Vdd, Vmin, and Vss. Further, the power circuit 57 is connected with a power control unit 101, and the drive voltage Vdd is controlled to a variable voltage value by the power control unit 101.

Furthermore, in Embodiment 1, the data-driven processor 1 is configured to be supplied with a power from a battery installed in the node N1, but the power supply is not limited to the battery, and may employ any power source such as an outlet or a rechargeable battery used in homes, offices and the like.

The power supply line 56 is connected with a galvanometer 58, and a consumption current value Iss in the power supply line 56 is detected by a consumption current detection unit 102 via an analog-to-digital converter (ADC) (not illustrated). In addition, the power control unit 101 increases or decreases a value of the drive voltage Vdd, in accordance with the consumption current value Iss which increases or decreases depending on the processing load of the data-driven processor 1.

Furthermore, in Embodiment 1, the data-driven processor 1 (the respective control units 101 and 102), the power circuit 57, the galvanometer 58, and the like are composed of one chip, but it is not limited thereto. The data-driven processor 1 and the power circuit 57 may also be composed of two or more separate chips.

Figure 4:
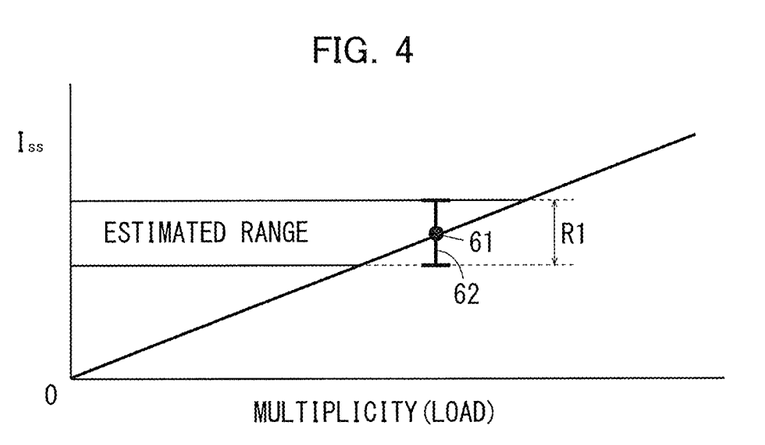
FIG. 4 is a graph illustrating a relationship between a processing load and a consumption current of Embodiment 1.

FIG. 4 is a graph illustrating a relationship between the processing load and the consumption current of Embodiment 1.

If the consumption current value Iss detected by the consumption current detection unit 102 is out of the range of current values estimated in advance, it is discriminated as an abnormal by an abnormality discrimination unit 103.

In addition, the abnormality discrimination unit 103 of Embodiment 1 discriminates whether a cumulative value of the consumption current value Iss is out of the range of current values estimated in advance, on the basis of the cumulative value of the consumption current value Iss of a preset period based on a sufficient time required for measurement from a periodicity of a sensing object (a time enough not to be affected by a fluctuation of the sensing results).

Although the event varies depending on the object sensed by each sensor node N1, for example, when the sensor node N1 detects a moving object as a human sensor, the detection of the object becomes an event, and when detecting a sound, the detection of the sound becomes an event. In addition, for example, in a case of a sensor for detecting vibrations, the detection of the vibration becomes an event, and in a case of a sensor for detecting a temperature, the detection of the temperature becomes an event. Then, when these events occur, power is consumed according to the processing, and the detection results are transmitted. Therefore, if a frequency of an occurrence of the events (a periodicity of the events) or the number of the events (a total amount of the events) is increased, the consumption current is increased, and if the frequency of an occurrence thereof is decreased, the consumption current is decreased.

Then, by experiences of a manager and a user or by installing and measuring for a constant period of time, it is possible to estimate the frequency and the number of occurrences of the events in each node N1, and it is also possible to estimate the range of consumption current. Therefore, when the sensor fails or an abnormality occurs in the sensing object, an event does not occur at all, or adversely, events occur an abnormally large number of times, which cause a deviation from the estimated current value range.

Herein, the range of current values to be estimated may be estimated in advance depending on, for example, a frequency of communication (an amount of packets transmitted and received within a fixed time). In addition, estimation is performed for each of the nodes N1 and N2 depending on a sensitivity of sensing of the sensor node N1 (when the sensitivity is sensitive, the frequency of event detection is increased). In addition, when the sensor node N1 is disposed at a position where an object passing on time (such as a train) is detected (regularly and periodically detected), or in cases of the sensor node N1 which regularly and periodically detects vibrations of a train or the like, the sensor node N1 which detects a periodically occurring sound such as a clock bell, or the sensor node N1 which detects a temperature change that varies during the day or night, etc., estimation for each of the nodes N1 and N2 is performed depending on the periodicity and the total amount of the events.

Furthermore, a period of measuring the cumulative value of the consumption current value Iss may be arbitrarily changed depending on the sensing object, a specification or design of the network system, and the like, but the period may be changed at any time or may be periodically changed. Further, it also may be configured to measure a change in the cumulative value (profile) over time and discriminate whether a slope of a curve of the profile, a width between peaks of a maximum value and a minimum value, etc. fall within the range estimated in advance.

In FIG. 4, a range R1 of current values of Embodiment 1 is a range R1, in which a margin 62 is considered in a consumption current value 61 corresponding to the processing load of the data-driven processor 1, is estimated in advance. Thereby, for example, since equipment of the node N1 falls, an earthquake occurs, etc., if the vibration (event) which is the sensing object is increased, or the number of events is increased, the consumption current value Iss becomes a value exceeding the range R1 of the current value.

In addition, when a signal is not input since the sensor 3 fails, the consumption current value Iss becomes a value smaller than the range R1 of the current value. Further, when the sensor 3 fails, if a signal such as noise continues to be constantly input, the consumption current value Iss becomes a value exceeding the current value range R1.

Furthermore, when the data-driven processor 1 itself fails, the event does not occur at all as described above, such that the current is not consumed, or the same processing is repeated due to the runaway, such that the consumption current value Iss falls within the range R1 of the current value.

Thereby, the abnormality discrimination unit 103 of Embodiment 1 may detect an abnormality of the sensing object, an abnormality of the sensor 3, and an abnormality of the data-driven processor 1 itself from the abnormality of the consumption current value Iss. Further, the consumption current value Iss has a high correlation with the processing load of the data-driven processor 1 and a high accuracy, as compared to the case in which it is based on the amount of input packets. Thereby, the accuracy of detection of the abnormality of the sensor 3 or the like may be easily improved.

Furthermore, the abnormality discrimination unit 103 of Embodiment 1 discriminates that, when the processor core processes data from the other nodes N1 and N2, and if any one or all of the data-driven processor 1, the wireless communication module 2, and the sensor 3 of the other nodes N1 and N2 fail, such that data is not received for a long time (when the other nodes N1 and N2 are so-called "silent"), the consumption current value Iss of the core is lower than the range R1. Adversely, when data is received more frequently than the frequency estimated in advance due to a failure of other nodes N1 and N2 or an external attack, etc. (when the other nodes N1 and N2 are so-called "runaway"), the consumption current value Iss of the core exceeds the range R1. Therefore, it is also possible to discriminate an abnormality (failure, external attack, etc.) of the nodes N1 and N2 the processing of which is conducted by the core.

In FIG. 2, a reception unit 104 receives data transmitted (broadcasted) from the other nodes N1 and N2.

A reception history storage unit 105 stores a node ID and a data ID included in the data received by the reception unit 104.

An abnormal node storage unit 106 stores the nodes N1 and N2 which are discriminated to be abnormal by the abnormality discrimination unit 103. The abnormal node storage unit 106 of Embodiment 1 stores the node ID of the node N1 discriminated to be abnormal.

An already-received discrimination unit 107 discriminates whether the data received by the reception unit 104 is the same as the data already broadcasted and received from the other node N1. From the node ID and the data ID included in the received data, the already-received discrimination unit 107 of Embodiment 1 discriminates whether these data are the data from the same transmission source as the already received data (the node of a transmission source rather than a relay node).

When receiving the data from the node N1 discriminated to be abnormal, a data discarding unit 108 discards the received data. Further, the data discarding unit 108 of Embodiment 1 also discards the received data when the already-received data is received.

A broadcast unit 109, as an example of the transmission unit, broadcasts (transmits) the detection results (monitoring results) from the sensor 3 to the neighboring nodes N1 and N2. That is, the data is transmitted, i.e., broadcasted to the nodes N1 and N2 present in the range in which a radio wave reaches from its own node N1. In addition, the broadcast unit 109 transmits (so to speak, transfers or rebroadcasts) the data from the other nodes N1 and N2 in which no abnormality has occurred to the neighboring nodes N1 and N2.

Figure 5A:
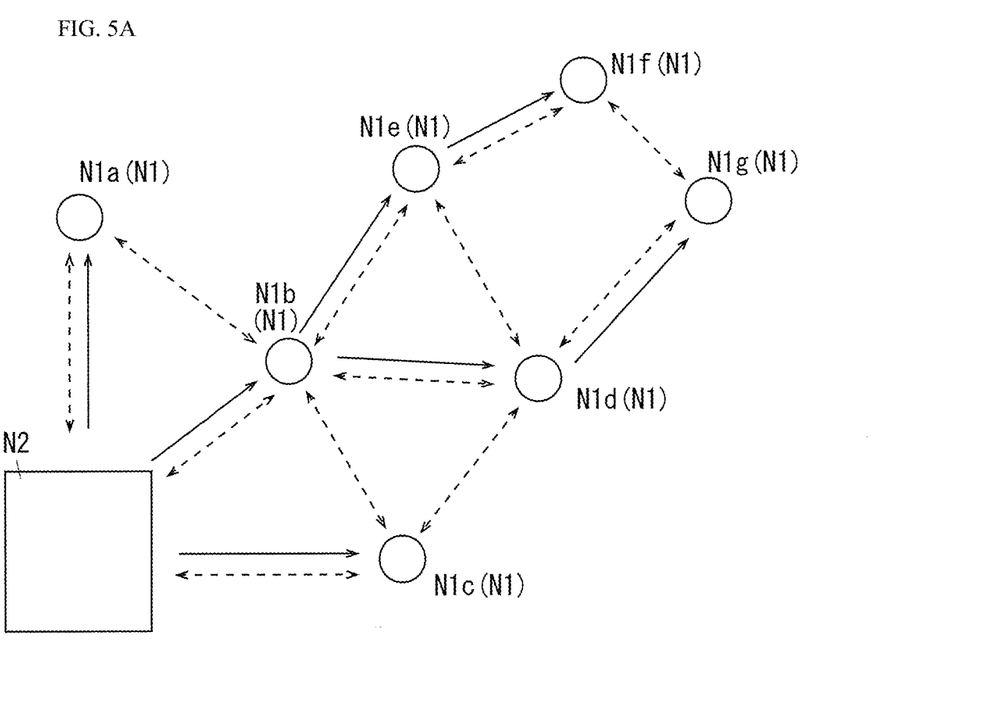
FIG. 5A is a diagram illustrating a state before an abnormal node occurs.
Figure 5B:
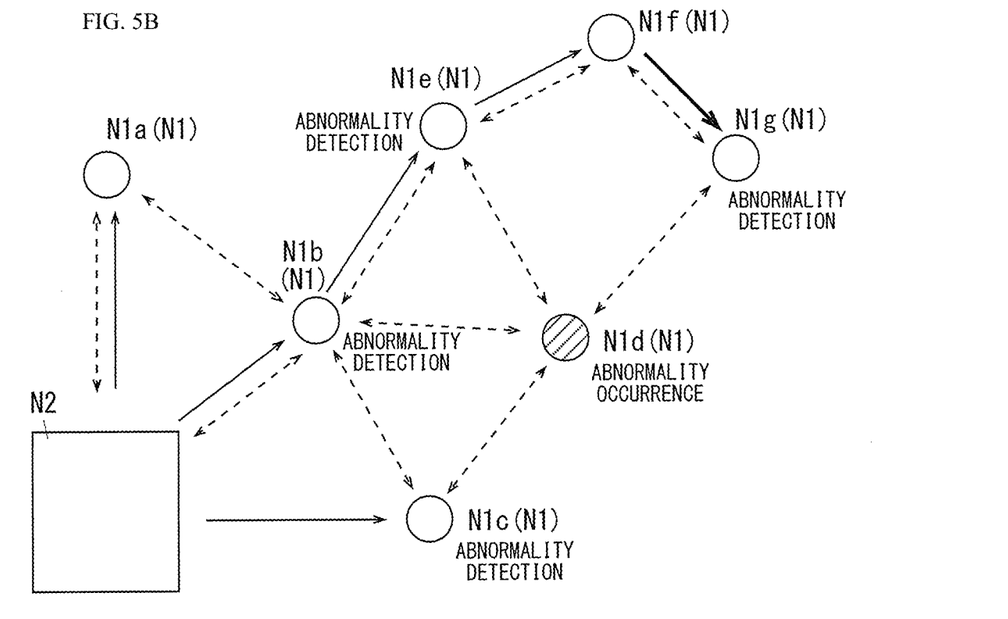
FIG. 5B is a diagram illustrating a case in which an abnormal node occurs.

FIGS. 5A and 5B are diagrams illustrating an example of the networking system of Embodiment 1, wherein FIG. 5A is a diagram illustrating a state before an abnormal node occurs, and FIG. 5B is a diagram illustrating a case in which an abnormal node occurs.

In the networking system S of Embodiment 1 having the above-described configuration, when receiving the data by its own nodes N1 and N2, the broadcast unit 109 transmits (broadcasts) the received data to the other neighboring nodes N1 and N2. In FIGS. 5A and 5B, as an example, a network having nodes N1a to N1g, and N2 may be considered. In FIG. 5A, when data is transmitted from a center node N2, there are cases in which the node N1a directly receives the data broadcasted from the center node N2, and receives the data which is received and rebroadcasted by the node N1b (relays the node N1b). In Embodiment 1, when the node N1a receives data from the center node N2 first, and receives data that has been relayed through the node N1b later, the received data is discriminated by the already-received discrimination unit 107, and discarded by the data discarding unit 108. Therefore, duplicate processing of the same data is reduced in the node N1a. Thereby, the processing load on each of the nodes N1 and N2 is reduced. In addition, since it is discarded when the same data is received, the data is not retransmitted from the node N1a. Therefore, congestion on the network is also reduced.

Accordingly, as illustrated by solid lines in FIG. 5A, in the respective nodes N1a to N1g, the data from the node N2 is received and rebroadcasted (transferred) by each node N1a to N1g, such that the data reaches all the nodes N1a to N1g. Further, as an example, FIGS. 5A and 5B illustrate a state in which the data reaches first along a path illustrated by the solid lines and the data reaches later along a path illustrated by broken lines to be discarded.

Further, in the networking system S of Embodiment 1, each of the nodes N1 and N2 discriminates whether the neighboring nodes N1 and N2 are abnormal. That is, it is constituted that the nodes N1 and N2 included in the network mutually monitor for the abnormality. Conventionally, there is no configuration in which the nodes N1 and N2 mutually monitor for the abnormality. In the configuration in which sensors for detecting an abnormality are arranged in each node, when an abnormality occurs in the communication module or the processor, data transmission itself cannot be performed even when attempting to transmit the detection result of the abnormality. Thereby, there is a problem that costs are increased if a sensor for detecting an abnormality is provided, or a network for communicating the abnormality detection result is separately built. On the other hand, in the networking system S of Embodiment 1, the abnormality of the other nodes N1 and N2 can be detected based on the processing status of the communication data with the other nodes N1 and N2. Therefore, the configuration may be simplified and the costs may be reduced as compared to the case of providing the sensor for detecting an abnormality in the other nodes N1 and N2 their selves or building a separate network.

In particular, in the networking system S of Embodiment 1, the data-driven processor 1 is used. As described above, a correlation between the processing load of the data-driven processor 1 and the consumption current is high and the accuracy is good. In a conventional common Neumann-type processor, the load is measured by a program (software). In the conventional Neumann-type processor, it is necessary to operate a program for observing the processing load, that is, for load measurement on a processor core which processes the received data and the like. In other words, only the processing load of the processor cannot be observed from the outside. Thereby, the execution itself of the program for load measurement is an unpredictable load, and the load at the time of execution cannot be accurately understood in advance. Therefore, the processing load and the consumption current are not always in conjunction with each other (the correlation is low). In addition, since a load due to the execution of the program for load measurement always occurs, it cannot be measured that the load is zero (or almost zero). Thereby, it is not possible to accurately detect that other nodes have stopped due to a failure or the like (a life-and-death monitoring), and there is a problem that a configuration for a life-and-death monitoring is separately required.

For example, in the life-and-death monitoring (for example, PING monitoring), information (PING) on the life-and-death monitoring is periodically transmitted and received, and the transmitted and received information is processed by software in each node (PING response processing or life-and-death discrimination processing), thus to detect the abnormality. Therefore, even in normal time, transmission and reception of the information for the life-and-death monitoring occur, and an overhead occurs for the original communication (transmission and reception of data other than the life-and-death monitoring) on the network.

Further, in the conventional life-and-death monitoring, a CPU (hardware) and software are required to be operated (resources are required) in order to discriminate an abnormality, and a load is generated. Thereby, the correlation between the consumption current and the processing load is reduced. Therefore, in the conventional configuration, it is difficult to discriminate the processing load only by observing the consumption current. Further, as described above, since the abnormality cannot be discriminated unless the CPU and the software are operating, there is also a problem that, if the CPU, the memory, and the like fail, or the software is runaway, the abnormality cannot be discriminated.

On the other hand, in the networking system S of Embodiment 1, the data-driven processor 1 is used, and only by observing the consumption current having a high correlation with the processing load, it is possible to discriminate an abnormality without requiring a configuration (software) dedicated to the life-and-death monitoring.

In addition, the abnormality discrimination unit 103 and the consumption current detection unit 102 may be provided outside the processor core which processes the received data and the like. Further, although the abnormality discrimination unit 103, etc. may be mounted by hardware, it is possible to achieve by software in a processor core dedicated to abnormality determination by providing the processor core dedicated to abnormality determination in a multiprocessor core configuration. As described above, in the conventional von-Neumann-type processor, it is necessary to operate a program for load measurement (for life-and-death monitoring) on the processor core which processes the received data and the like. Thereby, it is possible to observe the load from the outside in the networking system S of Embodiment 1, which could not be achieved by the conventional Neumann processor.

Further, as described above, the conventional life-and-death monitoring is a configuration in which a query (PING) and its response data are exchanged on the network, and there is also a problem that an overhead occurs for the original communication. However, in the networking system S of Embodiment 1, the processing load of the data-driven processor 1 may be observed from the outside of the data-driven processor 1 in each of the nodes N1 and N2, and the overhead problem does not occur. Thereby, there is no necessity for software dedicated to the life-and-death monitoring, which transmits and receives information for the life-and-death monitoring via the network to discriminate an abnormality.

Further, in the networking system S of Embodiment 1, the data transmitted from the nodes N1 and N2 discriminated to be abnormal is discarded (ignored). Therefore, the nodes N1 and N2 discriminated to be abnormal become substantially an isolation state from the network, so to speak. Thereby, in the networking system S of Embodiment 1, the respective nodes N1 and N2 may mutually monitor whether there is no abnormality, and may automatically isolate the nodes N1 and N2 in which the abnormality has occurred from the network.

In FIGS. 5A and 5B, a case, in which an abnormality occurs in node N1$d$, may be considered. When an abnormality occurs in the ode N1$d$, the nodes N1$b$, N1$c$, N1$e$, and N1$g$, within a range in which radio waves from the node N1$d$ may reach, detect the abnormality. Therefore, the received data from node N1$d$ is discarded. Thereby, an adverse effect from the node N1$d$ in which the abnormality has occurred is localized (the adverse effect is suppressed from spreading to the network). Accordingly, the node N1$d$ in which the abnormality has occurred becomes the isolation state from the network, so to speak.

Further, in FIG. 5A, while the node N1$g$ receives the data broadcasted by the node N1$d$ in which the abnormality has occurred, if an abnormality occurs in the node N1$d$, the data reaches the node N1$g$ via nodes N1$e$ and N1$f$, as illustrated in FIG. 5B. Therefore, even if the node N1*d* in which the abnormality has occurred is isolated, the data may reach the node N1*g*, and the network may be maintained even with the node N1*d* in which the abnormality has occurred being isolated. Thereby, in the networking system S of Embodiment 1, even if an abnormality occurs in the node on a data transmission path, the data is automatically transmitted and reaches along a bypass path, and redundancy is achieved in a good sense.

Further, in Embodiment 1, when an abnormality of the node N1 is detected, it may be also configured to transmit data for notifying the center node N2 of the node in which the abnormality has occurred.

Modification

In the above description, the embodiment of the present invention has been described in detail, but it is not limited to the above embodiment, and it is possible to perform various changes within the scope of the purport of the present invention described in claims.

For example, the configuration, in which the consumption current detection unit 102 and the abnormality discrimination unit 103 are provided in each of the processor cores 1*a*, 1*b*, 1*c* and . . . , has been exemplified, but it is not limited thereto. For example, it is also possible to configure in such a way that an abnormality is detected based on a total consumption current of the data-driven processor 1, and then a location (its own node or other nodes) of the abnormality is specified from the core subjected to excessive or insufficient packet processing after detecting the abnormality.

The configuration having the display 4 has been exemplified in the above embodiment, but it is not limited thereto, and a configuration without the display is also possible. Further, in addition to the display 4 and the wireless communication module 2, the node N1 may also be configured to have an arbitrary member such as an actuator, a lamp, a buzzer or the like.

In the above embodiment, the configuration, in which each sensor node N1 includes the sensor 3 as an example of the monitoring unit, has been exemplified, but it is not limited thereto. For example, it is also possible to apply the configuration of abnormality discrimination (mutual abnormality monitoring) and data discard (node isolation) of the present invention to a node that receives data from another node in the network and transmits (transfers, rebroadcasts) the data to the other nodes without the sensor 3, i.e., to a so-called relay node. In addition, the configuration having both the reception unit and the transmission unit has been exemplified, but it is not limited thereto. For example, a node such as a monitoring center may be configured as a node which only receives data transmitted from other sensor nodes N1 without the broadcast unit (transmission unit), and it is also possible to apply the configuration of abnormality discrimination and data discard of the present invention to this node.

In the above embodiment, the configuration, in which the abnormality discrimination is performed based on the cumulative value of the consumption current (temporal and/or profiled numerical value), has been exemplified, but it is not limited thereto. For example, when the value of the observed consumption current (so to speak, an instantaneous value) is excessive or insufficient, it is possible to discriminate as an abnormal. That is, if the consumption current value corresponding to the processing load when receiving the data from the sensor 3 observing in each node N1 has no abnormality, and falling thereof within a certain range is known through an experiment etc., it is also possible to discriminate that an abnormality has occurred when exceeding the range.

The invention claimed is:

1. A networking system comprising a plurality of nodes configured to communicate data connected with each other by a communication network, wherein each node comprises:
   a data-driven processor including a self-timed pipeline;
   a power circuit configured to supply a power to the data-driven processor;
   wherein the data-driven processor is configured to
     detect a consumption current through the data-driven processor;
     receive data from other nodes; and
     when a cumulative consumption current at the time of processing the data received from the other node is out of a range of current values estimated in advance based on an event at the other node, discriminate the other node as abnormal.

2. The networking system according to claim 1, wherein the data-driven processor is further configured, when receiving data from a node that has been discriminated as abnormal by the abnormality discrimination unit, to discard the received data, thus to isolate the node that has been discriminated as abnormal from the network.

3. The networking system according to claim 1, wherein a configuration to transmit and receive information for a node abnormality monitoring of each node via the network to discriminate the abnormality is not provided.

4. The networking system according to claim 1, comprising a range of current values estimated in advance based on a total amount of the events.

5. The networking system according to claim 1, comprising a range of current values estimated in advance based on a cycle of the event.

6. The networking system according to claim 1, wherein each node further comprises a communication module configured to communicate using at least one of a LAN protocol, a cellular protocol, or an NFC protocol.

7. The networking system according to claim 1, wherein the communication network is at least one of an ad hoc network, an autonomously distributed network, or a routed network.

* * * * *